ALLEN A. DUSWALT
INVENTOR

BY Michael B. Keehan

ATTORNEY

ALLEN A. DUSWALT
INVENTOR

ATTORNEY 3,692,687
PROCESS FOR STABILIZING HYDROX COMPOSITIONS CONTAINING MAGNESIUM OXIDES
Allen A. Duswalt, West Chester, Pa., assignor to Hercules Incorporated, Wilmington, Del.
Filed June 4, 1971, Ser. No. 149,979
Int. Cl. C06b 19/06; C06d 5/06
U.S. Cl. 252—184   13 Claims

ABSTRACT OF THE DISCLOSURE

Gas generating compositions having improved stability are prepared from alkali or alkaline earth metal nitrites, ammonium salts and magnesium oxide. The components are predried before mixing. The metal nitrites and ammonium salts must be predried separately. The predried magnesium oxide is admixed with either the alkali or alkaline earth metal nitrite or ammonium salt prior to admixing with the remaining unmixed component. The calculated water content of the final admixture must be less than 0.0015% by weight.

---

Figure 1:
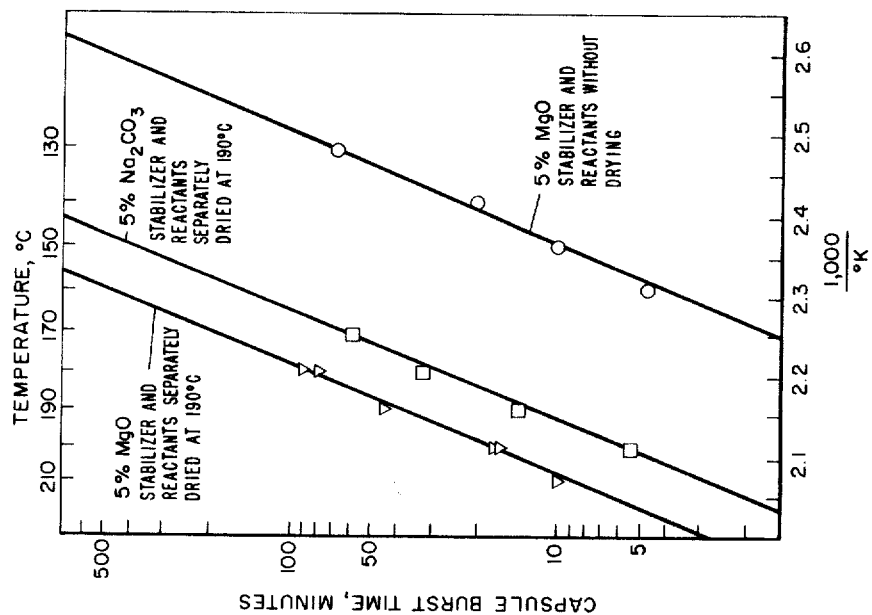

This invention relates to a process for stabilizing a gas generator mixture comprising an admixture of an alkali metal nitrite and an ammonium salt. More particularly, this invention relates to a process for improving the stability of a magnesium oxide stabilized gas generator mixture of an alkali or alkaline earth metal nitrite and an ammonium salt.

Compositions comprising an intimate admixture of an alkali metal nitrite and an ammonium salt, and in particular compositions comprising an intimate admixture of sodium nitrite and ammonium chloride have long been known as non-explosive, gas producing compositions. Compositions of this type are oftentimes referred to in the prior art as "Hydrox" powders or compositions. These compositions have principally been employed as blasting agents for use in mines. Hydrox compositions have many desirable properties. The principal deficiency with this class of gas generating compositions has been deterioration in the stability of the compositions during prolonged periods of storage.

Efforts have been made in the past to determine the factors affecting the stability of Hydrox compositions. Researchers have found that moisture is one cause of the deterioration of stability of the compositions. Hydrox compositions produce moisture as a product of decomposition. It is not surprising, therefore, that the rate of decomposition of these compositions has been found to increase with time. As a result of additional studies on the stability of Hydrox compositions, it was found that stability of the compositions improved with increasing pH values of the compositions. As a result of these studies, stabilizing agents which were both basic and exhibited drying properties were chosen for incorporation into Hydrox compositions. Tests showed that the stability of Hydrox compositions containing such stabilizing agents was improved. Stabilizing agents for Hydrox compositions found to be particularly suitable were the alkali and alkaline earth oxides, carbonates and bicarbonates. A discussion on stabilizing of Hydrox compositions can be found in a book by James Taylor, entitled "Solid Propellant and Exothermic Compositions," Interscience Publishers Inc., New York, 1959.

One of the preferred stabilizing agents heretofore known for use in Hydrox compositions was magnesium oxide. It has now been found, that the stability of magnesium oxide stabilized Hydrox compositions can be substantially improved through reduction in the water content of the compositions to a level of less than about 0.0015% by weight and through control of the amount of magnesium oxide employed.

In accordance with this invention a process is provided for preparing a Hydrox gas generating composition having improved stability, said process comprising the steps of:

(a) Predrying the gas generator composition components comprising an alkali or alkaline earth metal nitrite, an ammonium salt and magnesium oxide, said alkali or alkaline earth metal nitrite and ammonium salt being predried separately, one from the other, said predrying being conducted at a sufficiently elevated temperature and for a sufficient time to reduce the total water content of components to a level not exceeding about 0.0015% by weight of the total weight of the components, (b) Forming a gas generating admixture having improved stability by admixing the three predried ingredients of step (a), said admixture being prepared so that the magnesium oxide stabilizer is vigorously admixed with either the alkali or alkaline earth metal nitrite or the ammonium salt forming a first admixture prior to admixing of the remaining gas generating component with the first admixture, said gas generating admixture containing at least about 5% by weight of magnesium oxide.

There are various combinations of heating temperatures and times that can be employed to produce a stabilized gas generating composition of this invention. A particularly suitable combination is to heat the gas generating components separately in open containers for about 15 minutes at a temperature of about 190° C. Higher temperatures and longer heating times have little or no effect on improvement of the stability of the resulting composition. Temperatures below 190° C. can be used; however, the efficiency of drying magnesium oxide drops off sharply at temperatures below 190° C. At a lower drying temperature of say about 180° C. for example, substantially longer drying times are required in order to achieve a stabilized composition having optimum storage properties.

The following examples will fully illustrate this invention. In the examples, parts and percentages are by weight unless otherwise specified. Examples 1–14 illustrate the process for preparing a gas generator composition of this invention having improved stability and the determination of stability of the stabilized composition as a result of burst-pressure measurements.

EXAMPLES 1–14

Hydrox compositions are prepared from 41 parts of ammonium chloride, 54 parts of sodium nitrite, and 5 parts of stabilizing agent. The Hydrox composition components are predried as specified in Table I. The dried components are vigorously shaken together forming an admixture. In mixing, the predried stabilizing agent is thoroughly intermixed with either ammonium chloride or sodium nitrite forming a first admixture, prior to admixing the remaining ingredients.

A test apparatus is employed to measure the burst-pressure measurements from which the stability of the compositions is determined. The test apparatus consists of a temperature controlled tube oven, a gas thermal conductivity cell and controls, a time-base potentiometric recorder and a gas sweep system. Various Hydrox compositions predried as set forth in Table I are evaluated by charging about 15 milligrams of each composition into a sealed aluminum capsule of 20μ liters volume. The capsule is inserted into the tube oven. A helium flow purges the tube oven at a rate of 40 milliliters per minute for about one minute. The capsule is positioned in the heated tube oven. Under the high temperature conditions imposed upon the Hydrox mixture in the oven, reaction of the components is accelerated and gaseous decomposition products build up within the aluminum capsule principally in accordance with the following reactions:

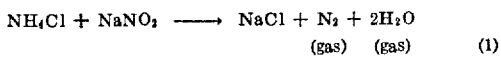

$$NH_4Cl + NaNO_2 \longrightarrow NaCl + N_2 + 2H_2O$$
$$\text{(gas)} \quad \text{(gas)} \qquad (1)$$

When the internal pressure in the capsule as a result of decomposition of the Hydrox mixture exceeds the capsule burst-pressure, the capsule ruptures and the released decomposition gases are swept through the thermal conductivity cell. The time-base potentiometric recorder indicates the time to burst which is a function of reaction rate and the measure of stability. The results of the stability tests conducted in the apparatus previously described are given in Table I.

TABLE I

| Example | Test temperature (°C.) | Minutes to burst, 5% Na₂CO₃ stabilized Hydrox | Minutes to burst, 5% MgO stabilized Hydrox |
|---|---|---|---|
| 1 | 130 | | a 6 |
| 2 | 140 | | a 20.2 |
| 3 | 150 | | a 10.2 |
| 4 | 160 | | a 4.8 |
| 5 | 170 | b 58.7 | |
| 6 | 180 | b 31.6 | |
| 7 | | | c 78 |
| 8 | | | d 81 |
| 9 | 190 | b 14.2 | |
| 10 | | | d 44 |
| 11 | 200 | b 5.4 | |
| 12 | | | b 17.2 |
| 13 | | | e 16.5 |
| 14 | 210 | | f 9.8 |

Predrying conditions:
a No predrying of stabilizer or components. Composition contains about 0.1% water.
b Separated components dried at 190° C. for 30 min.
c Separated components dried at 195° C. for 30 min.
d NaNO₂ and MgO dried together at 240° C. for 20 min. NH₄Cl dried separately at 195° C. for 20 min.
e NH₄Cl and MgO dried together at 190° C. for 30 min. NaNO₂ dried separately at 190° C. for 30 min.
f Separated components dried at 190° C. for 10 min.

From review of Table I it is apparent that Hydrox compositions containing 5% magnesium oxide as a stabilizing agent and prepared according to the process of this invention have longer burst times than similarly treated samples containing 5% sodium carbonate and also have much longer burst times than compositions containing 5% magnesium oxide which have not been dried and mixed in accordance with this invention. Burst times are inversely proportional to decomposition rates. On this basis Hydrox compositions prepared in accordance with this invention are three times more stable than a similarly treated composition employing sodium carbonate as a stabilizing agent and are about 100 times more stable than Hydrox compositions containing an equivalent weight of magnesium oxide wherein the water content of the composition is about 0.1% by weight.

An Arrhenius plot depicting the relationship of reaction velocity in terms of capsule burst time and temperature is derived from data set forth in Table I and is presented in FIG. 1. The greatly improved stability of Hydrox compositions prepared in accordance with this invention can be readily seen from examination of FIG. 1.

The following examples illustrate the effect of drying time and temperature relationships on the stability of Hydrox compositions.

EXAMPLES 15-17

Three sets of Hydrox components comprising ammonium chloride, sodium nitrite and magnesium oxide are each placed in open and compartmented aluminum containers. The components are separated in these containers. The containers are placed in open ovens and heated. One container is heated 24 hours at 115° C., one container is heated for 40 minutes at 174° C. and one container is heated for 10 minutes at 190° C. After heat treatment according to the conditions described, the contents of each container are cooled in a moisture free atmosphere. Hydrox compositions are prepared from the dried components by mixing 41 parts of ammonium chloride, 54 parts of sodium nitrite and 5 parts of magnesium oxide. In this mixing process the magnesium oxide stabilizer is first admixed with ammonium chloride to form a first mixture and sodium nitrite is subsequently admixed with the first mixture forming the stabilized compositions. Samples of the compostions subjected to the above heat treatment process conditions are tested for stability at 210° C. by charging the compositions to an aluminum capsule and testing them in the burst test apparatus as referred to in Examples 1-14. The effect of the drying conditions on the Hydrox composition stability is set forth in Table II below.

TABLE II

Drying conditions: Burst times at 210° C. test temperature
115° C. for 24 hrs.. 5.7 minutes, average of 9 tests.
174° C. for 40 min. 7.5 minutes, average of 8 tests.
190° C. for 10 min. 9.8 minutes, average of 10 tests.

It is apparent from the above data that the temperature of the preheating process (drying) is critically important in obtaining an optimum stabilized Hydrox composition. This is illustrated by the fact that a Hydrox composition whose components are preheated at 115° C. for 24 hours (1,440 minutes) decomposed approximately twice as fast as a composition heated only 10 minutes at 190° C. The importance of high temperature drying is again emphasized by the fact that even the relatively high drying temperature of 174° C. for a period of 40 minutes did not produce a composition having the stability of that achieved by drying for 10 minutes at 190° C. It is clear from the foregoing data that very high drying temperatures are critical and necessary for optimum stabilization of magnesium oxide stabilized Hydrox compositions.

The necessity for employing high temperatures in removing water from the components comprising the Hydrox mixture is not due to the drying requirements of ammonium chloride or sodium nitrite. Both of these salts lose their ability to retain moisture below 170° C. As a result of tests it has now been concluded that to achieve optimum stability of the improved Hydrox composition of this invention, that it is necessary to reduce the water content of the Hydrox mixture containing magnesium oxide to a level below 0.0015%. This moisture level valve can be calculated as described hereinafter.

In order to provide information as to the conditions at which the moisture content in magnesium oxide can be reduced to a level of 0.0015% or lower, the following example concerning weight-loss of water from substantially pure magnesium oxide by heating are presented.

EXAMPLE 18

Figure 2:
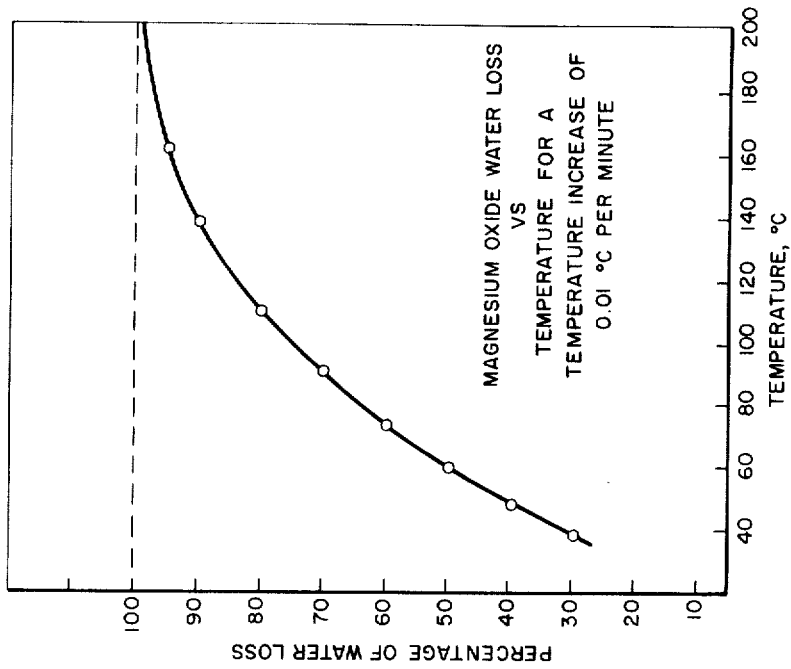

A series of magnesium oxide weight-loss determinations were made by heating small quantities of magnesium oxide in an open cup in a thermogravimetric analyzer. The samples are heated from ambient temperature at programmed heating rates of 1° C., 2° C., and 4° C. per minute. Results of these tests show that the magnesium oxide samples originally contained about 1% by weight of water. To approximate isothermal drying conditions the weight-loss data obtained from heating the magnesium oxide at the above rates were extrapolated to a very slow heating rate of 0.01° C. per minute. A curve of the percent of water loss vs. temperature is plotted for the extrapolated data and is shown in FIG. 2. From previous results set forth in Examples 15–17 it was found that the drying temperature for optimum stabilizing effect of the magnesium oxide stabilized Hydrox composition is between about 174° C. and about 190° C. for heating periods of 40 minutes or less. FIG. 2 shows water losses of 97% and 96% of the amount originally present in the magnesium oxide at temperatures of 190° C. and 174° C. respectively. These levels of moisture loss are equivalent to calculated moisture contents based on the original moisture content of 1% in the magnesium oxide of about 0.0015% to 0.0010% based on a Hydrox composition containing 5% by weight of magnesium oxide and assuming both the ammonium salt and alkali or alkaline earth metal nitrite employed contain no water (bone dry).

Determination of the rate of water loss from magnesium oxide as a function of water content in the magnesium oxide can be made from the following relationship:

$$k_1 = \beta \frac{\delta C}{\delta T}/(1-C) \qquad (2)$$

where $k_1$ is in units of percent water loss/minute, $\beta$ is the programmed heating rate for the magnesium oxide in degrees C./min., $\delta C/\delta T$ is the change in water content of the magnesium oxide per degree C. change in the magnesium oxide temperature as determined by the slope of a tangent which can be drawn to the curve in FIG. 2, and $(1-C)$ is the fraction of water lost at any tangent-curve contact point. The rate of water loss as a function of the amount of water remaining in a heated sample of magnesium oxide is given in Table III.

TABLE III

| Loss rate constant (percent/minute) | Percent of loss [1] | Measurement temperature, °C. |
|---|---|---|
| 0.15 | 40 | 48 |
| 0.19 | 70 | 90 |
| 0.25 | 80 | 110 |
| 0.29 | 90 | 138 |
| 0.35 | 95 | 161 |

[1] Based on an initial water content of magnesium oxide of 1% by weight.

From the foregoing data it is seen that the rate constant of 0.35%/minute for loss of water at 95% of water loss is only about double the rate loss at 40% of water loss although the temperature of heating of the magnesium oxide at 95% water loss is 113° C. higher than the temperature at 40% water loss. While not bound by any theory, it is believed that this very low increase in rate constant is due an activation energy requirement which increases as moisture content decreases.

Figure 3:
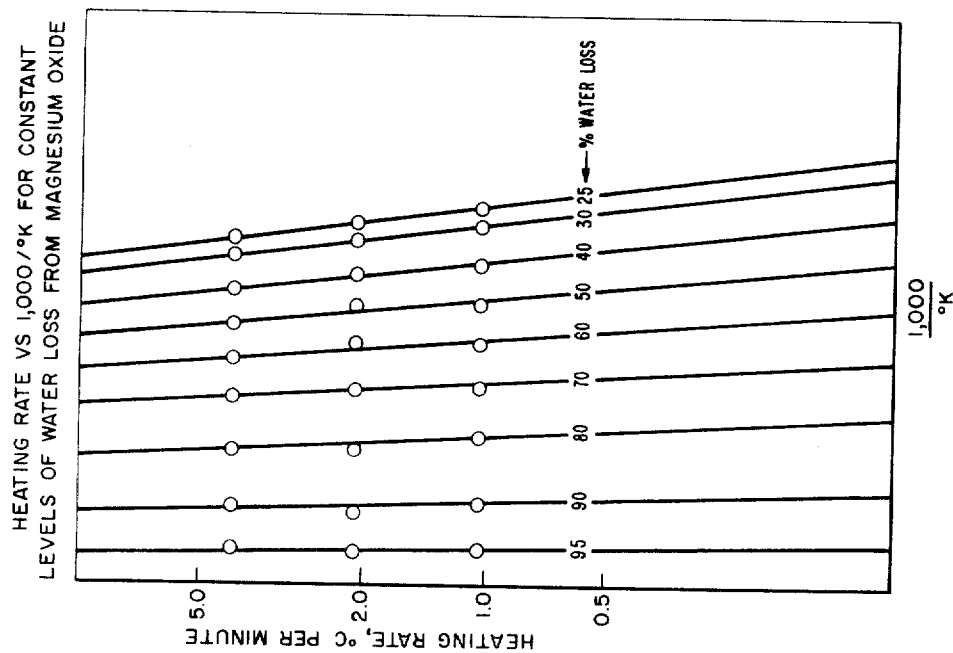

To confirm an increase in the apparent activation energies for moisture release at various levels of moisture content, the relationship of:

$$E = -4.35 \frac{\delta \log \beta}{\delta 1/T} \qquad (3)$$

was employed, where E is the energy of activation, $\beta$ is the heating rate, and T is the temperature for a specific degree of water loss, degrees K. The data for the calculations were provided from the thermogrammetric weight-loss data for magnesium oxide at rates of 1, 2 and 4° C. per minute. A plot of the log $\beta$ vs. $1/T$ for various levels of moisture loss, is shown in FIG. 3. It is apparent from FIG. 3, that the slope of each curve, $\delta \log \beta/\delta 1/T$ and therefore the activation energies of water release, become greater as the water level decreases. From the apparent activation values calculated from the line slopes of FIG. 3, and from the weight-loss constants $(k_1)$ calculated at a temperature $T_1$, degrees C. from the curve in FIG. 2, the rate of water loss $k_2$ from magnesium oxide can be calculated as a function of drying temperature $T_2$, degrees C. and percent moisture remaining from the relationship:

$$\log\left(\frac{k_1}{k_2}\right) = \frac{E}{2.3R}\left(\frac{T_2 - T_1}{T_2 T_1}\right) \qquad (4)$$

where E is the energy of activation as defined in equation (3) and R is the gas constant in calories/(degrees C.)(moles). The results of the above calculation are given in Table IV.

TABLE IV.—MAGNESIUM OXIDE RATE OF WATER LOSS, PERCENT PER MINUTE

| | Percent of total water remaining [1] | | | | | | | | |
|---|---|---|---|---|---|---|---|---|---|
| | 60 | 30 | 20 | 10 | 5 | 4 | 3 | 2 | 1 |
| Temperature, °C.: | | | | | | | | | |
| 60 | 1.4 | | | | | | | | |
| 70 | 8 | | | | | | | | |
| 80 | 40 | 0.01 | | | | | | | |
| 90 | 200 | 0.1 | 0.007 | | | | | | |
| 100 | | 2.5 | 0.2 | | | | | | |
| 110 | | 33.0 | 8.2 | | | | | | |
| 120 | | | 210 | 0.004 | | | | | |
| 130 | | | | 0.6 | | | | | |
| 140 | | | | 68 | 0.005 | | | | |
| 150 | | | | | 0.2 | 0.00007 | | | |
| 160 | | | | | 79 | 0.03 | 0.0002 | | |
| 170 | | | | | | 12.3 | 0.07 | 0.0001 | |
| 180 | | | | | | | 20.2 | 0.02 | |
| 190 | | | | | | | | 6.1 | 0.0006 |
| 200 | | | | | | | | | 0.5 |
| Calculated moisture, wt. percent, in Hydrox composition stabilized with 5% by weight magnesium Oxide | 0.030 | 0.015 | 0.010 | 0.005 | 0.0025 | 0.0020 | 0.0015 | 0.0010 | 0.0005 |

[1] Based on magnesium oxide originally containing 1% by weight water as determined from thermogravimetric analysis at 190° C.

It is apparent from the above results that the rate of water loss from magnesium oxide decreases greatly with decreasing moisture content. Referring to Table IV, it is seen that at a drying temperature of 150° C., which is very high for water drying processes, the first 90% of moisture is rapidly removed from magnesium oxide. At this temperature, however, reduction of moisture to the 95% moisture removed level (5% water remaining) takes place at a rate of 0.2% per minute. Little water can be removed past the 96% water removed level at 150° C. in any reasonable span of time since the removal rate decreases to about 0.00007% moisture removal per minute (approximately 0.1% of amount present per day).

The values set forth in Table IV, and in particular, the calculated percent moisture values of a magnesium oxide stabilized composition will vary depending on the original amount of water present in a charge of magnesium oxide being prepared for use in accordance with the process of this invention. Tables of data for a magnesium oxide charge containing any amount of water can be prepared following the procedure heretofore described. While individual values will be expected to change for magnesium oxide charges originally containing varying amounts of water, it is to understood that the calculated weight percent moisture in the stabilized compositions of this invention must not exceed about 0.0015% in order to achieve optimum stabilization. The original amount of water present in a charge of magnesium oxide is determined by weight-loss measurements by heating the charge at a temperature of at least 190° C. until the weight of the dried charge becomes essentially constant.

In preparing the stabilized Hydrox compositions in accordance with the process of this invention, it has been found that optimum stability is achieved when magnesium oxide is employed in the stabilized compositions in amounts of about 5% by weight or higher based on the weight of the magnesium oxide containing Hydrox composition. Stability of the compositions falls off rapidly as the magnesium oxide content is reduced below about the 5% level. The effect of varying amounts of magnesium oxide levels in Hydrox compositions prepared in accordance with this invention is illustrated in Example 19 which follows.

EXAMPLE 19

Figure 4:
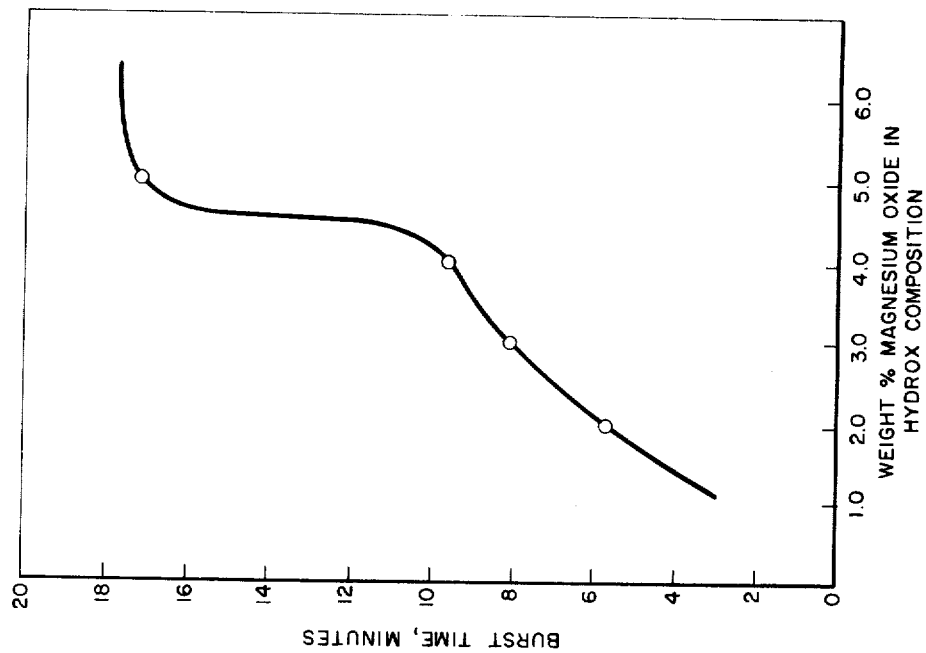

Hydrox compositions are prepared from ammonium chloride, sodium nitrite and magnesium oxide components which were separately dried 20 minutes at 190° C., cooled under moisture free conditions and then mixed in accordance with the process of this invention. The compositions prepared contain a stoichiometric mixture of ammonium chloride and sodium nitrite. Stability tests are conducted on the compositions at 200° C. following the procedure and employing the test apparatus as described in Examples 1-14. The results of the tests are shown graphically in FIG. 4. It is apparent from the curve that about 5% or greater concentrations of magnesium oxide are preferred for stabilizing the Hydrox compositions.

In preparing the magnesium oxide stabilized Hydrox compositions of this invention, it is necessary that predried magnesium oxide be admixed with only one component of the unstabilized Hydrox composition to form a first admixture prior to admixing the second Hydrox component to the first admixture. The first admixture is formed with vigorous mixing such as by shaking the solid components together so as to disperse the magnesium oxide throughout the first admixture. Either the ammonium salt or the alkali or alkaline earth metal nitrite can be admixed first with the magnesium oxide to form the first admixture.

Following predrying, the Hydrox composition components should be maintained in a moisture-free environment. It is preferred, when preparing the stabilized Hydrox composition of this invention, that the composition components be cooled after drying, preferably to about ambient temperature, prior to forming the admixture. Cooling is desirable to reduce the possibility of any reaction resulting from the presence of even the slight amount of water present, since reaction would be accelerated at elevated temperatures.

The magnesium oxide stabilized Hydrox compositions of this invention are prepared from alkali or alkaline earth metal nitrites and ammonium salts. Illustrative alkali or alkaline earth metal nitrites which can be employed include sodium nitrite, potassium nitrite, rubidium nitrate, cesium nitrite, lithium nitrite, magnesum nitrite, calcium nitrite, strontium nitrite, barium nitrite and mixtures thereof. Illustrative ammonium salts which can be employed include ammonium chloride, ammonium bromide, ammonium iodide, ammonium sulfate, ammonium sulfonate, mixtures thereof and the like.

The improved magnesium oxide stabilized Hydrox compositions of this invention should be stored in a substantially moisture free environment. Hydrox compositions prepared in accordance with the process of this invention have particular utility as blasting agents for use in mines and as chemical gas generators for inflation of inflatable devices such as air bags employed in automobile safety systems.

What I claim and desire to protect by Letters Patent is:

1. In the process of preparing a gas generating composition comprising an alkali or alkaline earth metal nitrite, an ammonium salt and magnesium oxide, the improvement comprising the steps of:
    (a) predrying the alkali or alkaline earth metal nitrite, ammonium salt and magnesium oxide to remove substantially all of the water contained in said components, said alkali or alkaline earth metal nitrite and ammonium salt being predried separately, one from the other, said predrying being conducted at a sufficient temperature and for a sufficient time to reduce the total water content of the components to a level not exceeding about 0.0015% by weight of the total weight of the components,
    (b) forming a stabilized gas generating admixture of the predried ingredients of step (a), said stabilized admixture being prepared so that the magnesium oxide stabilizer is vigorously admixed with either the alkali metal nitrite or the ammonium salt forming a first admixture prior to admixing of the remaining gas generating component with the first admixture, said stabilized gas generating admixture containing at least about 5% by weight of magnesium oxide.

2. The process of claim 1 in which the alkali metal nitrite is sodium nitrite and the ammonium salt is ammonium chloride.

3. The process of claim 1 in which the alkali metal nitrite is sodium nitrite and the ammonium salt is ammonium bromide.

4. The process of claim 1 in which the alkali metal nitrite is sodium nitrite and the ammonium salt is ammonium iodide.

5. The process of claim 1 in which the alkali metal nitrite is potassium nitrite and the ammonium salt is ammonium chloride.

6. The process of claim 1 in which the alkali metal nitrite is potassium nitrite and the ammonium salt is ammonium bromide.

7. The process of claim 1 in which the magnesium oxide is predried at a temperature of at least 174° C. until the water content of the magnesium oxide is reduced to a level not exceeding about 0.0015% by weight.

8. In the process of preparing a gas generating composition comprising an alkali or alkaline earth metal nitrite, an ammonium salt and magnesium oxide stabilizer, the improvement comprising the steps of:
    (a) predrying the alkali or alkaline earth metal nitrite, ammonium salt, and magnesium oxide to remove substantially all of the water contained in said components, said alkali or alkaline earth metal nitrite and ammonium salt being predried separately, one from the other, said predrying being conducted at a sufficient temperature and for a sufficient time to reduce the water content of the components to a level not exceeding about 0.0015% by weight of the total weight of the components, and (b) forming a stabilized gas generating admixture of the predried ingredients of step (a) containing at least 5% by weight of magnesium oxide by vigorously admixing predried magnesium oxide and alkali or alkaline earth metal nitrite forming a first admixture and then admixing ammonium salt to said first admixture forming a stabilized gas generating admixture.

9. In the process of preparing a gas generating composition comprising an alkali or alkaline earth metal nitrite, an ammonium salt and magnesium oxide stabilizer, the improvement comprising the steps of:

(a) predrying the alkali or alkaline earth metal nitrite, ammonium salt, and magnesium oxide to remove substantially all of the water contained in said components, said alkali or alkaline earth metal nitrite and ammonium salt being predried separately, one from the other, said predrying being conducted at a sufficient temperature and for a sufficient time to reduce the water content of the components to a level not exceeding about 0.0015% by weight of the total weight of the components, and (b) forming a stabilized gas generating admixture of the predried ingredients of step (a) containing at least 5% by weight of magnesium oxide of step (a) by vigorously admixing predried magnesium oxide and an ammonium salt forming a first admixture and then admixing alkali or alkaline earth metal nitrite to said first admixture forming a stabilized gas generating admixture.

10. The process of claim 8 in which the alkali metal nitrite is sodium nitrite and the ammonium salt is ammonium chloride.

11. The process of claim 9 in which the alkali metal nitrite is sodium nitrite and the ammonium salt is ammonium chloride.

12. The process of claim 10 in which the ammonium salt is ammonium bromide.

13. The process of claim 11 in which the ammonium salt is ammonium bromide.

References Cited

UNITED STATES PATENTS

| 3,390,032 | 6/1968 | Albert | 149—45 |
| 3,449,181 | 6/1969 | Armantrout et al. | 149—45 |
| 3,580,750 | 5/1971 | Griffith | 149—45 |

OTHER REFERENCES

Taylor, J.: "Solid Propellent and Exothermic Compositions," 1959, George Newness Limited, pp. 65–74.

HERBERT B. GUYNN, Primary Examiner

I. GLUCK, Assistant Examiner

U.S. Cl. X.R.

23—309; 149—45; 252—188.3, 350